Sept. 2, 1969   E. W. FARR   3,464,259
FLEXURE AND STRAIN GAUGE MOUNTING ASSEMBLY
Filed Dec. 15, 1967   2 Sheets-Sheet 1

INVENTOR
EMORY W. FARR
BY
Christensen, Sanborn, & Matthews
ATTORNEYS

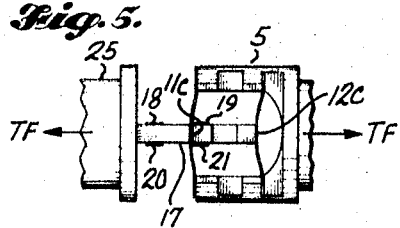
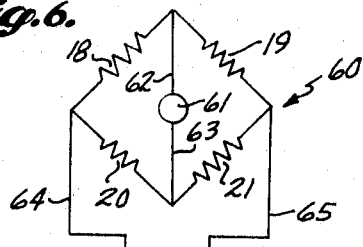
SHEAR = 18+21-(19+20)
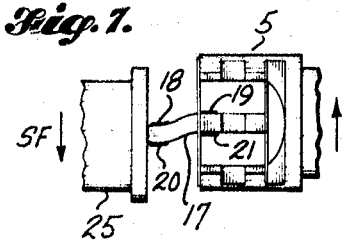
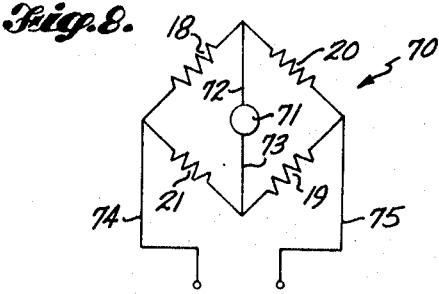
BENDING = 18+19-(20+21)
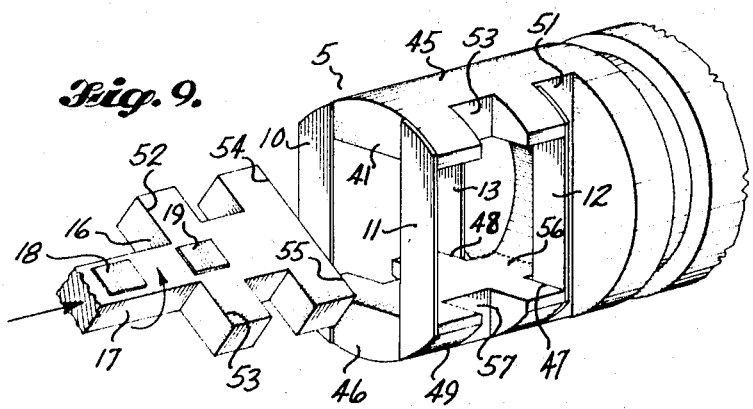
INVENTOR.
EMERY W. FARR
BY
ATTORNEYS United States Patent Office 3,464,259
Patented Sept. 2, 1969

3,464,259
FLEXURE AND STRAIN GAUGE MOUNTING ASSEMBLY
Emory W. Farr, West Covina, Calif., assignor to Electro Development Corporation, Lynnwood, Wash., a corporation of Washington
Filed Dec. 15, 1967, Ser. No. 690,977
Int. Cl. G01l 9/04
U.S. Cl. 73—88.5          7 Claims

ABSTRACT OF THE DISCLOSURE

This application discloses an improved flexure for mounting force-sensing devices such as strain gauges in a manner which renders the force-sensing devices essentially nonsensitive to forces occurring in one direction and yet extremely sensitive to forces applied in a second direction perpendicular to the first direction. A plurality of thin plate-like members are held in rigid parallel relationship with the plane of each parallel to said second direction. A transducer assembly such as a strain gauge beam is held by the plate members. The plate members are in turn held by a fixture is connectable to the surface of an object the displacement of which is to be measured. The arrangement is such that the plate-like members serve to transmit to the transducer esssentially all forces applied thereto in a direction parallel to the plane of the plates and hence act as rigid force-transmitting members in a direction parallel to their planes. The plate members are preferably made of thin material so that they flex relatively easily in a direction perpendicularly to their planes and thus the force-sensing assembly held by the plate members is essentially nonsensitive to forces occurring perpendicular to the planes of the plates. An improved technique for fabricating a flexure in accordance with the above concepts is also disclosed.

BACKGROUND OF THE INVENTION

Field of the invention

This invention relates to measuring devices and more particularly to an improvement in supporting a measurement assembly which is insensitive to forces applied in one plane to the member the displacement of which is being measured while quite sensitive to forces applied in another plane normal to said one plane.

Description of the prior art

Much effort has been devoted to the act of supporting a force-measuring device such as a strain gauge in proper relationship to or on an object the displacement of which is to be measured. A wide variety of support devices for strain gauges, commonly referred to as flexures, are available at the present time. Typical devices include blocks of steel having intricate cuts made therein so that forces will be transmitted in one direction to the strain gauge assembly within the flexure assembly, yet forces a perpendicular to the preferred axis will be absorbed to a large extent by the flexure. Error signals due to such perpendicular forces are thus reduced. In the past most flexure arrangements have been expensive to fabricate and also have not completely solved the problem of immunizing the strain gauges from forces perpendicular to the axis along which the forces to be measured are applied.

It is therefore an object of the present invention to provide an improved transducer mounting assembly. Another object of the present invention is to provide a novel strain gauge mounting assembly adapted to transmit forces along one direction to the starin gauge assembly and simultaneously render the strain gauge assembly held by the flexure substantially immune from the effects of forces perpendicular to the preferred direction.

An additional object of the present invention is to provide a simplified flexure assembly which is extremely efficient in the transmission of forces along a preferred plane and which is easily fabricated from low cost components. An additional object of the present invention is to provide an improved flexure which is less sensitive to thermal and undesirable mechanical movements than devices of the prior art. An additional object of the present invention is to provide a flexure utilizing low cost plate members for suspending a strain gauge assembly on a pair of surfaces the relative movement between which is to be sensed by the strain gauge assembly.

SUMMARY OF THE INVENTION

In accordance with the teachings of the present invention a plurality of thin plate members are arranged in parallel relationship and are firmly held by a mounting assembly in such relationship. The plate members are so positioned that a transducer assembly having strain gauges bonded thereto can be rigidly held by the plate members. The arrangement is such that forces applied parallel to the planes of the plate members will be accurately reflected in the strain gauge assembly held by the plate members while simultaneously the plate members can undergo bending in response to forces perpendicular to their planes and thus prevent the introduction of error signals in the transducer assembly output. In one preferred embodiment the plate members are arranged along the four parallel edges of a rectangular parallelpiped with the planes of all four plate members being parallel. A strain gauge support assemby is then welded to the midpoint of each of the four plate members with the strain gauge assembly extending in a direction perpendicular to the planes of the plate members. The outer ends of the four plate members are rigidly held by a mounting apparatus having means for connecting the same to a surface on an object the displacement of which is to be measured. A second mounting apparatus holds the remote end of the strain gauge apparatus which may be in the form of a sensing beam. The second assembly is adapted to be secured to a second point on the object the displacement of which is to be measured. The plate members then serve to transmit to the sensing beam those forces resulting from relative movement between the first and second points on the object being observed, but only such movements as is parallel to the plane of the plate members give rise to output signals from the transducer assembly. Relative movement between the two points in a direction perpendicular to the planes of the plate members merely causes the plate members to bend and hence no effective force is reflected in the strain gauge output circuit.

The mounting arrangement is such that when the strain gauges on the sensing beam are wired in a first bridge circuit arrangement shear forces are measured, whereas if the strain gauges are wired in a different circuit arrangement bending forces are measured. Thus the flexure makes possible an improved multiple use force-sensing system.

The above and additional objects of the invention will be more clearly understood from the following description when read with reference to the accompany drawings.

BRIEF DESCRIPTION OF THE DRAWINGS

FIGURE 5 is a diagrammatic illustration of the improvided flexure assembly when subjected to loads applied normal to the plane of the plates supporting the sensing beam;

FIGURE 6 is a schematic circuit diagram showing the bridge circuit for measuring shear forces applied to the improved flexure;

FIGURE 7 is a diagrammatic illustration of the improved flexure when subjected to shear forces;

FIGURE 8 is a schematic circuit diagram showing the bridge circuit for measuring bending forces applied to the improved flexure; and FIGURE 9 is a diagrammatic illustration of one phase of the fabrication assembly of the improved flexure.

DESCRIPTION OF THE PREFERRED EMBODIMENT

Figure 1:
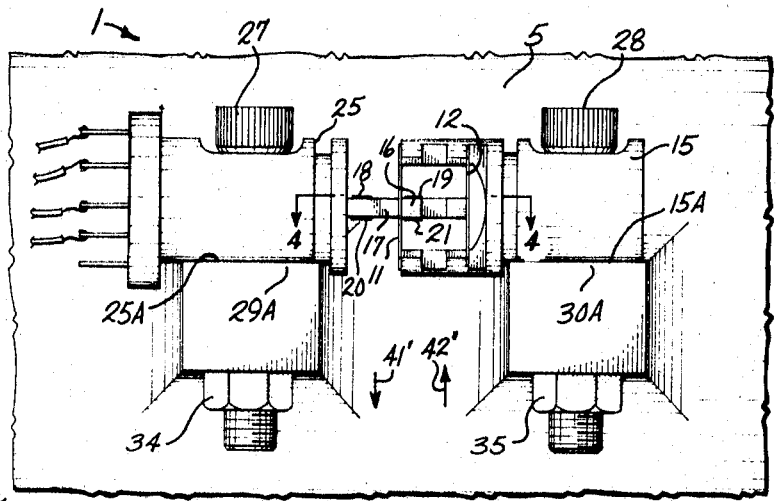
FIGURE 1 is a front view of the improved flexure assembly shown in position on a pair of heavy lugs attached to a structural member the displacement of which is to be measured.

With more particular reference to the improved flexure assembly 1 shown in FIGURES 1–4, it is seen that the transponder support 5 includes four thin plate members 10, 11, 12 and 13, which are held in a mutually parallel relationship with one another by plate mounting member 15. The outer ends 10A, 10B, to 13A, 13B of the plates 10–13 are fixed, as by welding to mutually parallel contact surfaces 41, 42, 43 of upper H-shaped supporting element 45 and contact surfaces 46, 47, 48 of the lower H-shaped supporting element 49. Upper supporting element 45 is separated from lower supporting element 49 by means of bridging arms 51, 56 extending from the web portions 53, 57 of the H formed elements 45, 49 to body element 50 all forming the components of plate support 15. With this support arrangement good results have been obtained using plates of 17–7 pH stainless steel having a thickness of 0.005 inch and an unsupported length of 0.4 inch between upper and lower support elements 45 and 49. A transponder in the form of stress sensing beam 17 extends in a direction generally normal to the plates 10–13 to which it is attached at the midpoints 10C–13C of the plates by connector 16.

In order that the transponder 17 is subjected to even loading from plates 10–13, the H-shaped connector 16 includes fastening surfaces 52–55 which are mutually parallel with plates 10–13 at the points of attachment. As shown, beam 17 is unitary with connector 16 with its remote end 17A welded to beam mounting member 25. Of course, beam 17 could also be made unitary with mounting member 25. Transponder beam 17 supports strain gauges 18 and 19 on its upper surface and train gauges 20 and 21 on its lower surface.

Figure 2:
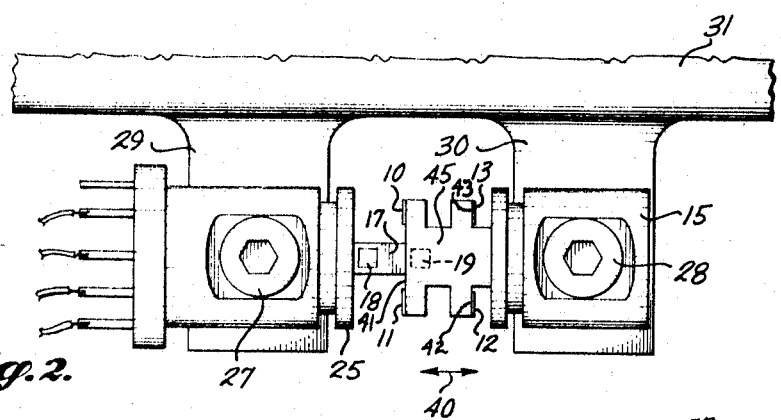
FIGURE 2 is a top plan view of the apparatus of FIGURE 1.
Figure 3:
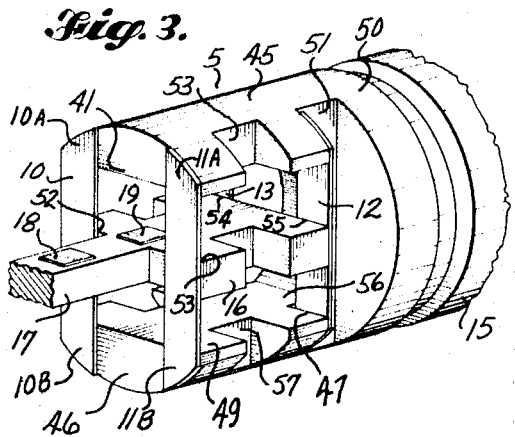
FIGURE 3 is an isometric view showing in greater detail the manner in which the flexure assembly and associated transducer beam are connected.
Figure 4:
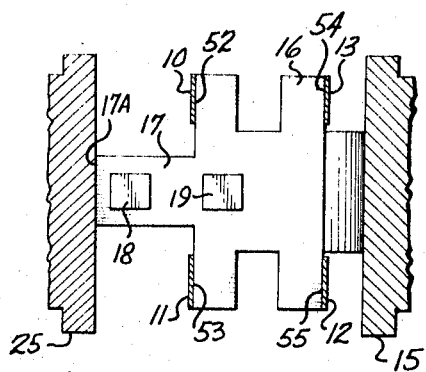
FIGURE 4 is a sectional view of the flexure and beam assembly along lines 4—4 of FIGURE 1.

As seen in FIGURES 1 and 2, the members 15 and 25 are provided with openings for receiving the heavy locking bolts 27 and 28. For purpose of illustration the apparatus is shown as being affixed to the lugs 29 and 30 extending in a general radial direction from the structural member 31. For this purpose the lugs 29 and 30 have vertical bores for receiving the bolts 27 and 28. To assure an accurate positioning of the parts on the structural member 31, the surfaces 25A and 15A on the holding members 25 and 15 are made flat and adapted to engage with the flat surfaces 29A and 30A on the heavy lugs provided on the structural member 31. The arrangement is such that when the nuts 34 and 35 are tightened the entire assembly is rigidly held to the structural member 31 so that shear forces acting on the structural member 31 and reflected as relative movement between the lugs 29 and 30 in a direction parallel to the planes of the plate members 10–13 will be transmitted to the sensing beam 17. As described hereinafter, such forces acting on the sensing beam 17 give rise to a composite output signal from the bridge circuit having strain gauges 18–21 therein which is proportional to the shear forces acting on the structural member 31.

It is of importance to note that due to the relative thickness of the plate members 10–13 as compared to their length the members act as rigid bodies in response to forces applied parallel to the plane of the members 10–13 but act as spring members in response to forces perpendicular to their planes. That is, if the lugs 299 and 30 tend to move away from each other along the direction indicated by the arrows 40 in FIGURE 2, the plate members 10–13 will flex and absorb any such relative movement without reflecting any bending moments in the sensing beam 17. However, when the plugs 29 and 30 undergo relative movement in the directions indicated by arrows 41' and 42' in FIGURE 1, the sensing beam 17 will be subjected to forces proportional to the shear displacement of the lugs and hence the strain gauges will provide an accurate indication of the shear forces acting on the structural member 31.

The operation of the measuring apparatus can be better understood with reference to FIGURES 5–8 which illustrate three conditions of loading imposed upon the transponder support 5 as a result of forces applied to the structural member 31 to which it is attached. FIGURES 5 and 6 schematically illustate the operation of the measurement assembly under conditions of loads which are applied normal to the plane of plates 10–13 such as a tension force TF which tends to pull the transponder support 5 away from the second mounting member 25. The stresses applied to the sensing beam 17 as it is suspended between the midpoints 10C, 11C, 12C and 13C of plates 10–13 and the second mounting member 25 are electrically reflected by the Wheatstone bridge circuit 60 shown in FIGURE 6. An energizing signal source 61 is connected by leads 62 and 63 to the strain gauges 18–21 to develop an output signal carried by output leads 64 and 65 connected to the opposite diagonals from those connected by leads 62 and 63 of the bridge circuit 60. Since the plates 10–13 are thin and span an equal unsupported distance on either side of their midpoints 10C–13C, the plates flex in a direction normal to their planes. The sensing beam feels balanced stressees and therefore the strain gauges yield an output signal of zero.

In a similar manner and with reference to FIGURE 7, it is seen that the output signal of bridge circuit 60 is proportional to the shear forces SF applied to the sensing beam 17. With shear forces applied parallel to the plane of plates 10–13, the plates 10–13 act as a rigid body and transfer such forces to the sensing beam 17 without flexing. As shown in FIGURE 7 the shearing forces applied to the structural member 31 tend to displace the second mounting member 25 downwardly and the transponder support 5 upwardly. This tendency causes sensing beam 17 to become S shaped and the stresses are measurable by the output signal of the circuit 60 shown in FIGURE 6.

If the bending stresses applied to the structural member 31 are to be determined it is only necessary that a different bridge circuit, such as circuit 70, shown in FIGURE 8 be used instead of circuit 60, shown in FIGURE 6. As shown in FIGURE 8, an energizing signal source 71 is connected by leads 72, 73 to the strain gauges 18–21 which have been rearranged to develop an output signal proportional to bending stress as applied to sensing beam 17. The output signal is carried by output leads 74 and 75 connected to the opposite diagonals from those connected by leads 72, 73 of the bridge circuit 70.

For ease of assembly the upper and lower supporting elements 45 and 49 are H-shaped and are displaced from body element 50 by means of narrow bridge arms 51, 56. In sequence the plates 12 and 13 are first spot welded to supporting elements 45, 49 one weld at a time. The slots formed by the bridge arms 51, 56 and the web portions 53, 57 of H formed upper and lower elements 45, 49 permit access to the supporting surfaces 42, 43, 47 and 48 with the electrodes of the welder. Next the plates 10 and 11 are welded one weld at a time to surfaces 41 and 46. The sensing beam 17 with connector 16 is then inserted on edge as shown in FIGURE 9 between plates 10 and 11 and supporting elements 45, 49. The height of the H formed connector 16 is less than the separation between elements 45 and 49 to permit this insertion. Strain gauges 18–21 are then connected as in bridge 60 so that as each weld is made between the fastening surfaces 52–55 to the midpoints 10C–13C of the plates 10–13 an output signal of zero is maintained to insure that these connections are accurately made and the pre-strain of beam 17 is held to a minimum to increase the fatigue life of the strain gauges 10–13.

What is claimed is:

1. A transducer assembly for measuring relative movement between two points comprising in combination: an elongated sensing beam having an elongated axis and a plurality of force sensing devices secured thereto arranged to be responsive to forces other than those parallel to said axis; a first beam support having means for rigidly securing the support to said first point and including first and second elongated support sections which are spaced apart and extend in substantially parallel relationship; a plurality of thin plate-like members each having its opposite ends respectivey secured to said support sections with said members spanning the space between said sections with their planes being maintained parallel, said beam having one end portion thereof connected to said first beam support solely by being rigidly secured to each of said plate-like members intermediate said sections with the plate means being spaced along the longitudinal axis of said beam and with the longitudinal axis of said beam being perpendicular to the planes of said members; and means for securing the other end of said beam to said second point.

2. The apparatus of claim 1 wherein:
said supporting sections are H-shaped elements with the side faces of said H-shaped elements providing support surfaces for fixed support of the ends of four of said plate members.

3. The apparatus of claim 1 wherein:
said one end of said beam means includes an H-shaped connector providing contact surfaces on the side faces of said H shape for fixed attachment with the midpoint of the spanning portion of four of said plate members.

4. A support apparatus for force sensing assemblies comprising a mounting member, two relatively spaced H-shaped elements extending from said member in mutually parallel planes and having two parallel legs which provide mutually parallel contact surfaces, a plurality of thin plate means spanning the space between said H-shaped elements having their outer ends fastened to said contact surfaces and adapted to support a transponder support means extending generally normal to the plane of said plates from the midpoint of said plates, each of said legs having at least one of said plate means attached to one of said contact surfaces.

5. The apparatus of claim 4 wherein:
said transponder support means includes a connector means having a plurality of mutually parallel fastening surfaces for securing said connector to the midpoints of said plate means with said connector forming one end of a transponder sensing beam which extends in a direction normal to the plane of said fastening surfaces,
said connector means defining an H form with the height of the H less than the separation between said two supporting elements for holding said outer ends of said plates.

6. The apparatus of claim 4 wherein said H-shaped elements are attached to said member by means of an extension of the cross-bar of the H.

7. A method of accurately positioning a transponder sensing beam at the structural midpoints of thin force transmitting plates comprising:
positioning the connecting surfaces of said beam adjacent the apparent midpoints of the plates,
sensing the stresses imposed on said beam by conventional strain gauge bridge circuits,
changing the positioning of said connecting surfaces until the stresses applied to its major surfaces are balanced, and then
firmly securing said beam to said plates.

References Cited

UNITED STATES PATENTS

| 3,168,826 | 2/1965 | Paetow | 73—141 |
| 3,164,014 | 1/1965 | Redner | 73—141 |
| 2,853,764 | 9/1958 | De Michele | 338—6 |
| 2,741,120 | 4/1956 | Ormsby | 73—141 |
| 2,453,601 | 11/1948 | Statham | 338—6 |
| 2,067,803 | 12/1937 | Thearle | 73—71.2 |

JAMES J. GILL, Primary Examiner

J. W. WAHLEN, Assistant Examiner

U.S. Cl. X.R.

73—133; 338—6